United States Patent [19]

Voelpel

[11] Patent Number: 4,676,713
[45] Date of Patent: Jun. 30, 1987

[54] MATERIAL HANDLING MACHINE

[76] Inventor: Charles E. Voelpel, 819 SE. 178th, Portland, Oreg. 97233

[21] Appl. No.: 805,857

[22] Filed: Dec. 6, 1985

[51] Int. Cl.⁴ .................. B66F 11/00; B66C 23/00
[52] U.S. Cl. .................... 414/590; 414/737; 414/735; 414/728; 901/1; 901/29
[58] Field of Search ............ 901/1, 40, 22, 29; 414/590, 589, 737, 730, 735, 738, 681, 682, 728; 180/154, 305; 212/224, 210

[56] References Cited

U.S. PATENT DOCUMENTS

| | | | |
|---|---|---|---|
| 1,721,816 | 7/1929 | Glazer | 414/10 |
| 3,087,630 | 4/1963 | Karnow et al. | 414/590 |
| 3,099,358 | 7/1963 | Clark | 212/224 |
| 3,361,280 | 1/1968 | Traver | 414/627 |
| 3,409,158 | 11/1968 | Lull | 414/639 |
| 3,575,301 | 4/1971 | Panissidi | 901/22 X |
| 3,683,747 | 8/1972 | Pettit | 901/22 X |
| 3,765,550 | 10/1973 | Tausheck | 414/541 |
| 3,858,735 | 1/1975 | Zrostlik | 414/735 X |
| 3,871,468 | 3/1975 | Miura | 180/154 |
| 3,909,056 | 9/1975 | Duwe | 294/67.22 |
| 3,926,318 | 12/1975 | Kister | 414/11 |
| 3,999,795 | 12/1976 | Barker | 414/737 X |
| 4,046,346 | 9/1977 | Iijima et al. | 414/728 X |
| 4,147,263 | 3/1979 | Frederick et al. | 212/224 X |
| 4,252,360 | 2/1981 | Gallaher, Jr. | 901/1 X |
| 4,280,785 | 7/1981 | Albrecht | 414/735 |
| 4,394,106 | 7/1983 | Frees et al. | 414/622 |
| 4,484,655 | 11/1984 | Sheppard, Sr. | 180/305 X |

OTHER PUBLICATIONS

M. Rosheim, "A New Pitch-Yaw-Roll Mechanical Robot Wrist Actuator", Society of Manufacturing Engineers, vol. 2, Jun. 1985, pp. 15-23, 15-24, 15-32 thru 15-34.
Brochure, Air Technical Industries, pp. 36, 37, no date.

Primary Examiner—Robert J. Spar
Assistant Examiner—Jay I. Alexander
Attorney, Agent, or Firm—Henderson & Sturm

[57] ABSTRACT

A material handling machine including a power driven, steerable chassis which supports a vertical mast and a pivotally attached telescoping boom having a material carrier rack, including a device for securing material to the rack. The mast is supported on a base that is selectively movable in a transverse direction with respect to the chassis. The end of the telescoping boom carries a hydraulic orbiting motor that provides for selective rotation of the rack in either a clockwise or counterclockwise direction. A pair of hydraulic cylinders, together with a universal joint, are attached to the rack and provide for pivoting or tilting of the rack about both the vertical and horizontal axes.

3 Claims, 10 Drawing Figures

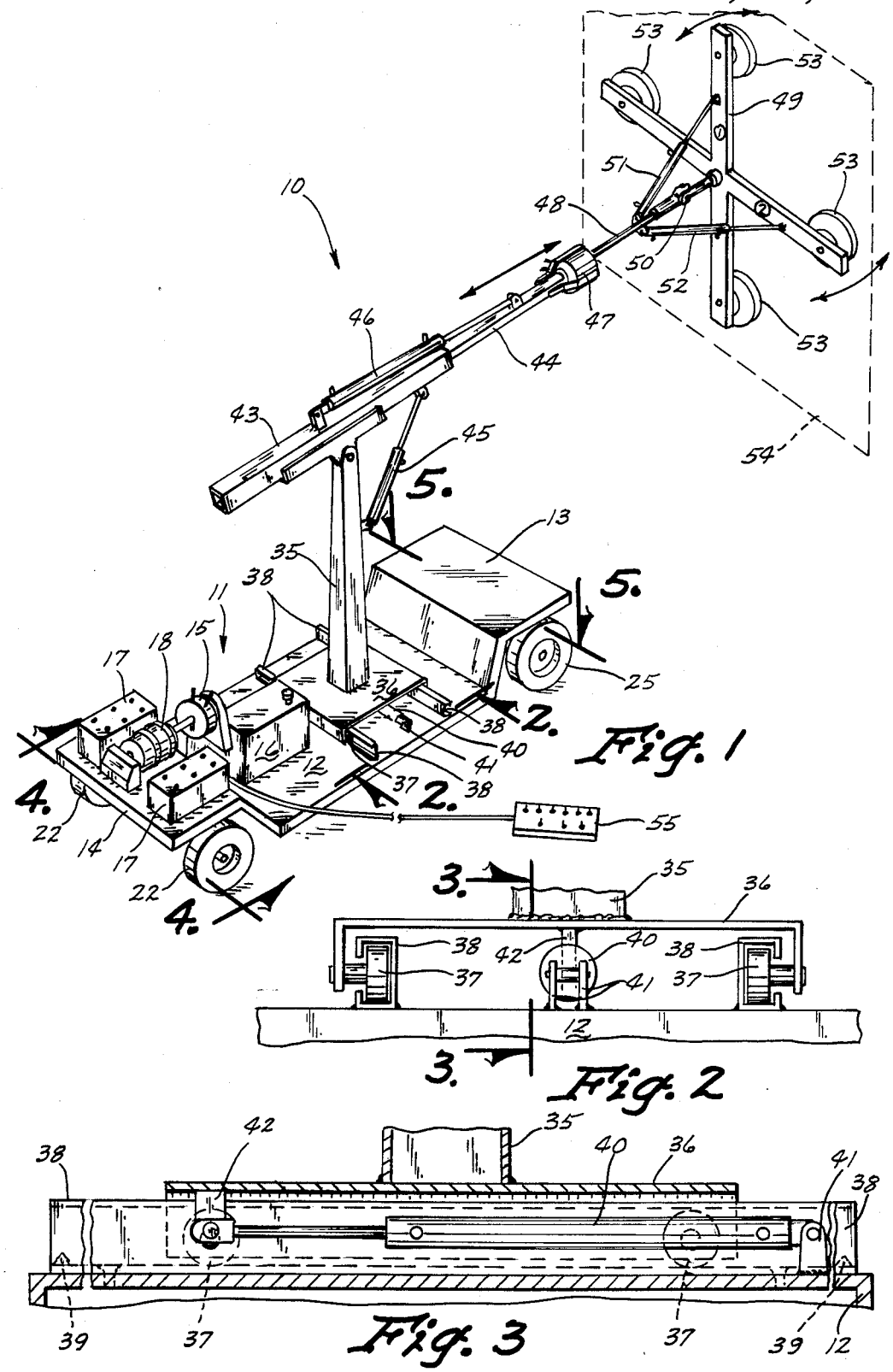

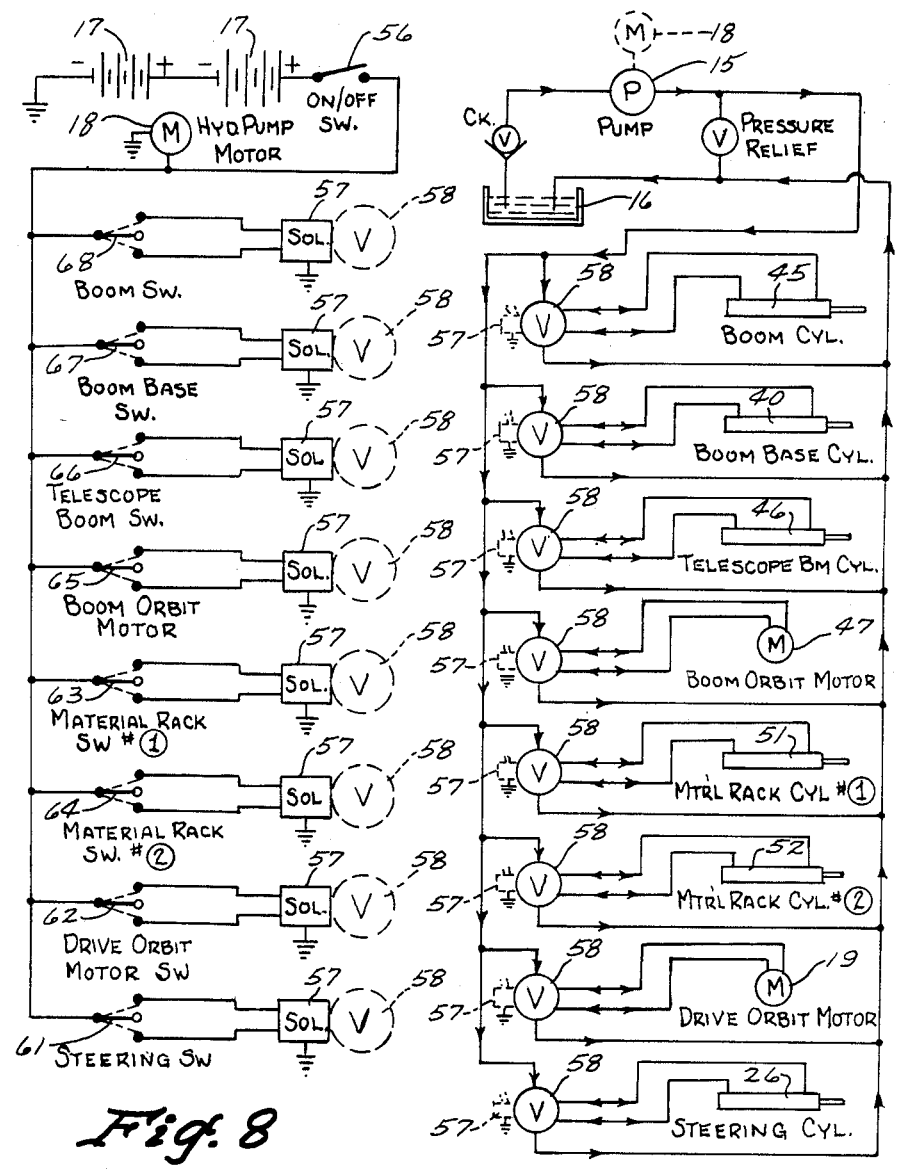
Fig. 8
Fig. 9
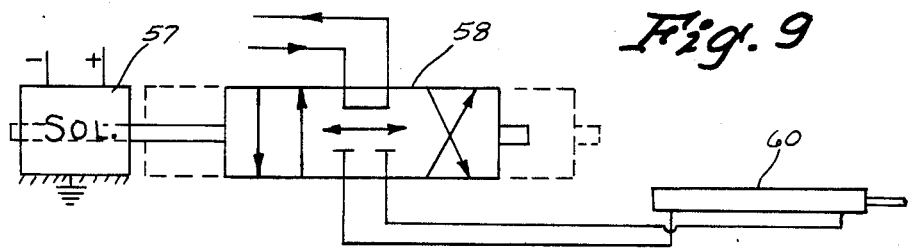
Fig. 10

4,676,713

1

MATERIAL HANDLING MACHINE

TECHNICAL FIELD

This invention relates to material handling devices and more particularly to material handling machines useful for safely and efficiently transporting and positioning flat panels of material.

BACKGROUND ART

Numerous material handling devices have been used to aid in the physical transporting and positioning of various materials, including flat panels of material such as glass sheets. Conventional machines, particularly those designed to handle sheets of glass, have been complicated in structure and limited in usefulness due to a limitation in the possible range of movement of the glass sheet. Handling of glass sheets, even when using available machines, requires a number of skilled operators and assistants.

Those concerned with these and other problems recognize the need for an improved material handling machine.

DISCLOSURE OF THE INVENTION

The present invention provides a material handling machine including a power driven, steerable chassis which supports a vertical mast and a pivotally attached telescoping boom having a material carrier rack, including a device for securing material to the rack. The mast is supported on a base that is selectively movable in a transverse direction with respect to the chassis. The end of the telescoping boom carries a hydraulic orbiting motor that provides for selective rotation of the rack in either a clockwise or counter-clockwise direction. A pair of hydraulic cylinders, together with a universal joint, are attached to the rack and provide for pivoting or tilting of the rack about both the vertical and horizontal axes.

The device for securing material to the rack includes a number of vacuum cups suitable for securing flat panels of material such as glass sheets. A hand-held control box allows for convenient and easy manipulation of the hydraulic cylinders and orbiting motors that provide for the numerous movements generally needed to handle, position and move glass sheets.

An object of the present invention is the provision of an improved material handling machine.

Another object is to provide a material handling machine that is safe for handling and positioning flat panels of material such as glass sheets.

A further object of the invention is the provision of a material handling machine that allows for a wide range of movement which permits flexibility in use with a number of materials.

Still another object is to provide a material handling machine which is simple in structure and easy to maintain.

A still further object of the present invention is the provision of a material handling machine which allows for efficient use of labor in handling and installing glass sheets.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the material handling machine of the present invention wherein vacuum cups are attached to the material carrying rack to securely hold flat panels of material such as glass sheets;

FIG. 2 is an enlarged side elevation sectional view taken along line 2—2 of FIG. 1;

FIG. 3 is a rear elevation sectional view taken along line 3—3 of FIG. 2;

FIG. 8 is a schematic drawing illustrating the electrical control of the double acting solenoids used to control the hydraulic motors and cylinders used on the machine;

FIG. 9 is a schematic drawing illustrating the hydraulic circuit for selective operations of the hydraulic motors and cylinders used on the machine; and FIG. 10 is a greatly enlarged schematic view illustrating a hydraulic selector valve in the neutral position wherein no hydraulic fluid flows to the hydraulic cylinder, and showing in dashed lines the positions of the selector valve when hydraulic fluid flows to retract and extend the cylinder rod.

BEST MODE FOR CARRYING OUT THE INVENTION

Figure 4:
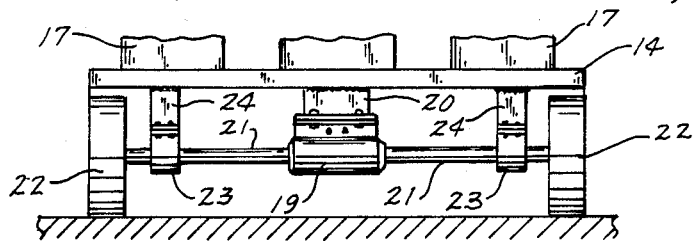
FIG. 4 is an enlarged rear elevation sectional view taken along line 4—4 of FIG. 1.

Referring now to the drawings, wherein like reference numerals designate identical or corresponding parts throughout the several views, FIG. 1 shows the material handling machine of the present invention generally designated by the reference numeral 10. The machine (10) includes a chassis (11) having a central position (12) and raised front and rear portions (13 and 14). The central portion (12) carries a hydraulic pump (15) and a hydraulic fluid reservoir (16) while the rear portion (14) carries batteries (17) and an electric motor (18). Although the machine (10) illustrated has a self-contained power source, it is to be understood that a converter (not shown) could allow the use of an outside power source.

Referring now to FIG. 4, it can be seen that a hydraulic orbiting driver motor (19) is attached to the underside of the rear portion (14) of the chassis (11) by bracket (20). An axle (21) extends from the drive motor (19) and is drivably connected to a first pair of ground engaging wheels (22). The axle (21) is secured in position and aligned by a pair of carrier bearings (23) attached to the underside of the rear portion (14) by brackets (24). The drive motor (19) has forward and reverse flow capabilities that allows for forward and reverse movement of the chassis (11).

Figure 5:
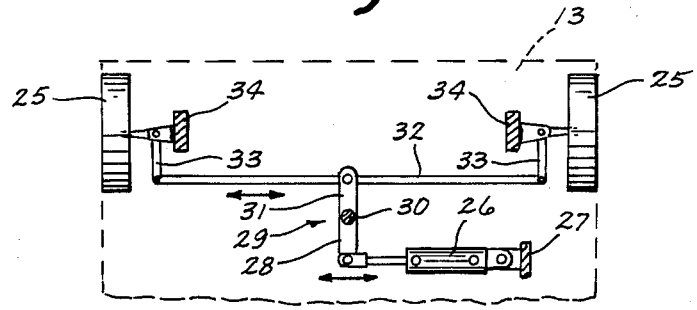
FIG. 5 is an enlarged top plan sectional view taken along line 5—5 of FIG. 1.

As most clearly shown in FIG. 5, steering of the chassis (11) by a second pair of ground engaging wheels (25) is controlled by a hydraulic steering cylinder (26). One end of the steering cylinder (26) is attached to a bracket (27) and the other end is attached to one end (28) of a pivot arm (29). The pivot arm (29) is attached to the underside of the front portion (13) of the chassis (11) by pivot point (30) and the other end (31) is attached to a steering control arms (32). Rods (33) interconnect the ends of the control arm (32) to the ground wheels (25). The rods (33) are pivotally attached to brackets (34) to provide for steering of the machine (10) by extension and retraction of the steering cylinder (26).

Referring now to FIGS. 1-3, the mast (35) is supported by a mast base (36) and extends upwardly from the central portion (12) of the chassis (11). The mast base (36) has rollers (37) attached thereto, which rollers (37) are received in tracks (38) attached to the chassis (11). The travel of the rollers (37) within the tracks (38) is limited by stops (39) (FIG. 3). A hydraulic mast base cylinder (40) interconnects the central portion (12) of the chassis (11) and the mast base (36) by attachment to lugs (41 and 42). Transverse movement of the mast base (36) and the attached mast (35) is provided by operation of the mast base cylinder (40).

Again referring to FIG. 1, a first boom section (43) is pivotally attached to the mast (35) and a second boom section (44) is telescopically received therein. A hydraulic boom pivoting cylinder (45) interconnects the mast (45) and the first boom section (43) while the hydraulic boom telescoping cylinder (46) interconnects the first and second boom sections (43 and 44). Operation of the boom pivoting cylinder (45) and the boom telescoping cylinder (46) provides for raising and lowering of the first boom section (43) and extension and retraction of the second boom section (44).

A hydraulic orbiting boom motor (47) is carried on the end of second boom section (44) and a shaft (48) interconnects the boom motor (47) and a material carrying rack (49). A universal joint (50) together with the operation of a first hydraulic rack cylinder (51) and a second hydraulic rack cylinder (52) provides for pivotal movement of the rack (49) about both its horizontal and vertical axes. Operation of the boom motor (47) allows both clockwise and counter-clockwise rotation of the rack (49) for 360 degrees in both directions with the ability to stop the rotation at any point.

Although various materials could be handled by the machine (10) and various means could be employed to secure materials to the rack (49), FIG. 1 illustrates vacuum cups (53) attached to the rack (49) and flat panels of material (54) secured by a vacuum source (not shown) applied to the cups (53). Also, it is to be understood that the operator could ride on the machine (10) in lieu of operating the machine (10) by the remote hand-held control box (55) illustrated in FIGS. 1 and 7.

Operation of the hydraulic orbiting motors (19 and 47) and the hydraulic cylinders (26, 40, 45, 46, 51 and 52) can best be understood by reference to FIGS. 7-10. The control box (55) includes an on-off switch (56) which controls the supply of power from the batteries (17) to the hydraulic pump motor (18) and a series of double acting solenoids (57).

As illustrated by the example of FIG. 10, each solenoid (57) is operably connected to a series of hydraulic selector valves (58) which are biased to the neutral position wherein flow of hydraulic fluid to and from the cylinder (60) or hydraulic motor (not shown) is prevented. When the solenoid (57) is activated to extent as shown in the dashed lines on the right of FIG. 10, the hydraulic selector valve (58) directs fluid to the piston side of the hydraulic cylinder (60) to cause it to extend. When the solenoid (57) is activated to retract as shown in the dashed lines on the left of FIG. 10, the selector valve (58) directs fluid to the rod side of the cylinder (60) and causes it to retract.

Figure 7:
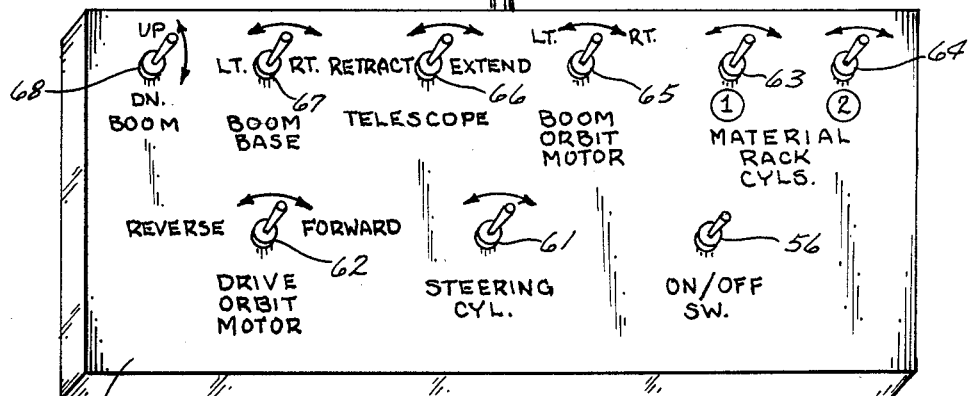
FIG. 7 is a greatly enlarged perspective view of the hand-held central box used in operating the machine to transport and position materials.

Referring now to FIGS. 7-9, the steering cylinder switch (61), the drive orbit motor switch (62), the first material rack cylinder switch (63), the second material rack cylinder switch (64), the boom orbit motor switch (65), the boom telescoping cylinder switch (66), the boom base cylidner switch (67), and the boom pivoting switch (68) are all biased to neutral and movable in the directions indicated in the directional arrows on the control box (55). This acts to extend or retract its respective solenoid (57) which in turn activates the respective orbiting motor (19 or 47) or cylinder (26, 40, 45, 46, 51 or 52) to provide the movements desired by the operator.

Figure 6:
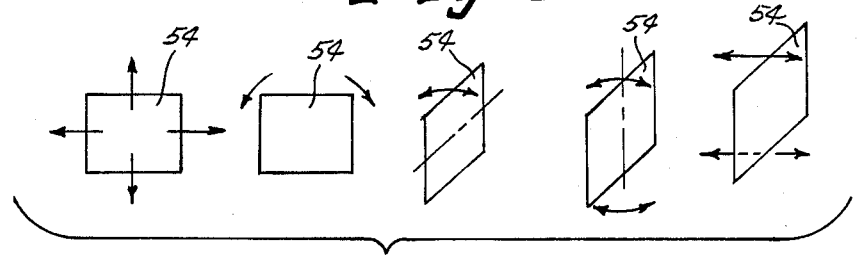
FIG. 6 is a schematic view illustrating the range of motion of a flat panel of material to be transported and positioned by the material handling machine of the present invention.

As shown by reference to FIGS. 1 and 6, a flat panel of material (54), for example a sheet of glass, can be selectively positioned and moved up, down, to the left, to the right; rotated 360 degrees in either direction; pivoted forward or backward about a horizontal axis or vertical axis; and moved forward or backward. Each of these individual movements as well as any combination of these movements can be conveniently made by an operator by selective manipulation of the switches on the hand-held control box (55). The machine (10) thereby allows for the safe handling and positioning of various materials including flat panels of material (54) such as glass. The machine (10) of the present invention allows a single operator to accomplish the difficult task of handling flat panel material in a safe and productive manner.

Thus, it can be seen that at least all of the stated objectives have been achieved.

Obviously, many modifications and variations of the present invention are possible in light of the above teachings. It is therefore to be understood that, within the scope of the appended claims, the invention may be practised otherwise than as specifically described.

I claim:

1. A flat panel handling machine for use in transporting and positioning large flat sheets of material, the machine comprising:

a chassis;

ground engaging wheels attached to and supporting said chassis;

means for driving said ground engaging wheels;

means for steering said chassis;

a mast attached to and extending upwardly from said chassis; wherein, said mast is mounted on a base having rollers attached thereto, and said rollers are disposed to be received in a track attached to said chassis;

means for selectively moving said mast in a transverse direction on said chassis; including a hydraulic mast base cylinder operably attached to and interconnecting said mast and said chassis; and means for controlling the flow of hydraulic fluid to said mast base cylinder;

a boom pivotally attached to said mast and extending outwardly therefrom;

means for selectively pivoting said boom with respect to said mast; including a hydraulic boom pivoting cylinder attached to and interconnecting said mast and said boom, and means for controlling the flow of hydraulic fluid to said boom pivoting cylinder;

means for selectively extending and retracting said boom; including a first boom section disposed to telescopically receive a second boom section and a hydraulic boom telescoping cylinder attached to and interconnecting said first and second boom sections; and means for controlling the flow of hydraulic fluid to said boom telescoping cylinder;

a shaft having one end attached to an end of said boom and extending outwardly therefrom;

a material carrying rack attached to the other end of said shaft;

means for selectively rotating said rack; including a hydraulic orbiting boom motor operably attached to and interconnecting said second boom section and one end of said shaft; and means for controlling the flow of hydraulic fluid to said boom motor;

means for securing material to said rack; including vacuum cups attached to said rack; and a vacuum source for applying a vacuum on said cups; and, means for pivoting said rack about its vertical and horizontal axes; including, a universal joint attached to and interconnecting the other end of said shaft and said rack; a first hydraulic rack cylinder attached to and interconnecting said shaft and said rack; a second hydraulic rack cylinder disposed normal to said first rack cylinder and attached to and interconnecting said shaft and said rack; and, means for controlling the flow of hydraulic fluid to said first and second rack cylinders.

2. The machine of claim 1; wherein, said driving means includes a hydraulic orbiting drive motor having a driven axle attached to and extending therefrom to operably attach to and drive a first pair of said ground engaging wheels; and means for controlling the flow of hydraulic fluid to said drive motor.

3. The machine of claim 2; wherein, said steering means includes a hydraulic steering cylinder operably attached to a steering control arm which is attached to, and controls, a second pair of said ground engaging wheels; and means for controlling the flow of hydraulic fluid to said steering cylinder.

* * * * *